United States Patent

[11] 3,593,125

[72] Inventors Peter G. Wilhelm
6710 Elroy Place, Oxon Hill, Md. 20022;
Harry T. Shover, 4683 Cedar Ridge Drive,
Oxon Hill, Md. 20021
[21] Appl. No. 842,318
[22] Filed July 16, 1969
[45] Patented July 13, 1971

[54] CRYSTAL TESTING APPARATUS FOR USE WITH AN OSCILLOSCOPE
2 Claims, 1 Drawing Fig.
[52] U.S. Cl. ............................................. 324/56, 324/57 R
[51] Int. Cl. ............................................. G01r 27/00
[50] Field of Search ............................................. 324/56, 57; 331/178

[56] References Cited
UNITED STATES PATENTS
| | | | |
|---|---|---|---|
| 2,356,510 | 8/1944 | Derserno | 324/57 |
| 2,411,298 | 11/1946 | Shore | 324/56 X R |
| 2,542,275 | 2/1951 | Ekstein | 324/56 |
| 3,227,967 | 1/1966 | Ebisch | 331/178 |
| 3,333,215 | 7/1967 | Israel | 331/178 UX |
| 3,361,986 | 1/1968 | Catania | 331/178 XR |
| 3,469,087 | 9/1969 | Seaton | 324/56 XR |

FOREIGN PATENTS
| | | | |
|---|---|---|---|
| 1,153,384 | 3/1958 | France | 324/56 |

Primary Examiner—Gerard R. Strecker
Attorneys—R. I. Tomkins, Arthur L. Branning, J. G. Murray and R. J. Erickson ABSTRACT: Apparatus for quickly determining the characteristics of a crystal. An oscillator, the frequency range of which is varied by either varying or inserting different impedances in the tank circuit, energizes the crystal being tested. The sawtooth sweep signal of an oscilloscope is used to vary the capacitance of a diode which in turn causes the oscillator to sweep through the frequency range broadly set by the tank circuit impedance.

PATENTED JUL 13 1971  3,593,125
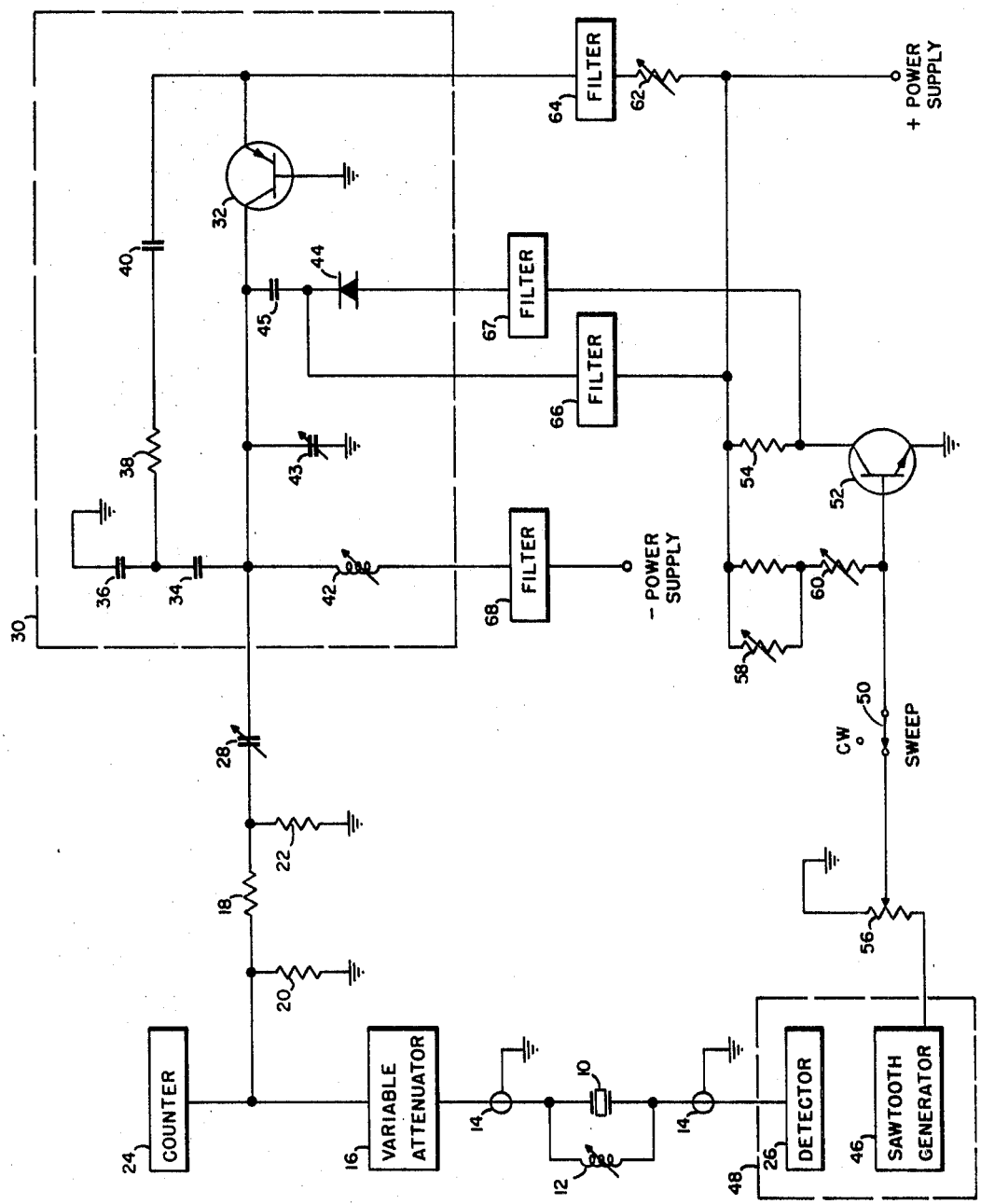
INVENTORS
PETER G. WILHELM
HARRY T. SHOVER
BY
ATTORNEYS 3,593,125

CRYSTAL TESTING APPARATUS FOR USE WITH AN OSCILLOSCOPE

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

Accompanying the rapid expansion of space effort and technology is the equally rapid and related expansion of the need to test crystals, both for frequency response and impedance and for the changing of such characteristics as a result of changing environmental conditions such as pressure, temperature, acceleration and cosmic radiation. Prior to the present invention, the known procedures for testing crystals were time consuming, required a large amount of apparatus and did not, in general, provide a satisfactory evaluation of crystal behavior.

SUMMARY OF THE INVENTION

The invention herein described improves over the prior crystal-testing procedures by using simple and inexpensive apparatus which is adaptable to fast testing techniques to determine the characteristics of crystals. More specifically, the invention contemplates the use of the sawtooth sweep signal of an oscilloscope to drive an oscillator through a frequency range which may be altered as desired by varying or replacing impedance components. The oscillator signal is used to energize and test the crystal being examined. A frequency meter and the oscilloscope display are used to evaluate the crystal tests.

OBJECTS OF THE INVENTION

It is, therefore, an object of this invention to provide an improved apparatus for testing crystals.

Another object is to provide circuitry which can be used with an oscilloscope to rapidly test crystals.

Yet another object of the invention is to provide apparatus which includes a readily variable impedance component and which can be used with an oscilloscope to rapidly test crystals.

A still further object is to provide circuitry that includes a variable frequency oscillator having a readily changeable or "plug in" inductive component and a variable capacitive component. This oscillator is driven by the sawtooth sweep signal of an oscilloscope. The circuitry further utilizes the oscilloscope display provisions to rapidly determine the frequency and impedance characteristics of crystals.

DESCRIPTION OF THE DRAWING

Other objects and features of the invention will become apparent to those skilled in the art as the disclosure is made in the following description of a preferred embodiment of the invention as illustrated in circuit diagram form in the sole FIGURE of the accompanying sheet of drawing.

DESCRIPTION OF THE PREFERRED EMBODIMENT

Reference is now made to the sole figure of the drawing. Crystal 10, the characteristics of which it is desired to determine, is connected in parallel with a variable inductance 12 which is turned to neutralize the quadrature impedance of the crystal by the well-known technique of optimizing the crystal response curve in the vicinity of resonance.

As is indicated in the drawing by the grounding of the outer wiring 14, it is contemplated that conventional good practice techniques will be followed in the fabrication of the invention (which includes a VHF oscillator yet to be described).

The crystal 10, which is under test, is isolated from the above mentioned VHF oscillator by a fixed resistive network and a variable attenuator 16. Typically the attenuator 16 can have a 0–12 db. range and the resistive network can be comprised of a series-connected 91-ohm resistor 18 which is grounded on both ends through 82-ohm resistors 20 and 22. Attenuator 16 and the resistive network 18, 20, 22 function to prevent overload damage to the crystal 10 and to variably reduce the excitation amplitude and thereby allow a rapid determination of changes in the crystal characteristics for different levels of excitation.

The invention contemplates the provision of instrumentation for determining the crystal characteristics. Typically such instrumentation can include a frequency meter or counter 24 connected to the input of attenuator 16 and a detector 26, such as an oscilloscope or a strip recorder, connected to the crystal 10. As is well known, the impedance of the crystal 10 is purely resistive at resonance and may be determined by the prior and routine calibration of the detector 26 with a variable resistance.

Variable capacitor 28 is used to tune, i.e. impedance-match the VHF oscillator 30 and the already described attenuating circuitry 16–22. As shown, the oscillator 30 can be modified form of Colpitts oscillator and include an active element, such as transistor 32, driving a tank circuit comprised of capacitors 34 and 36 and a feedback circuit of limiting resistor 38 and phase-shifting capacitor 40 connected between the capacitor. Oscillator 30 can be rough tuned by inductance 42, which can be one of several plug-in units or an inductance that can be varied in value by switching or other known means. Frequency selection can also be made by varying capacitor 43. The frequency of oscillator 30 is also varied by diode 44, the capacitance of which varies as the voltage applied across the diode is changed. While it is true that all semiconductor diodes exhibit a variation in the capacitance across their junction as the bias voltage across the junction is varied it is generally advisable to use a diode which is specifically designed to enhance this effect. Usually the variation in capacitance of such diodes is too large to provide the very narrow frequency deviations which are desired in crystal testing. Therefore, capacitor 45 is connected in series with capacitor 44 to reduce the resultant capacitance change in the tank circuit to the desired level. As will subsequently become more apparent, the testing of crystal 10 is accomplished by precisely varying the voltage across diode 44 and thereby sweeping the frequency of oscillator 30 through the desired narrow frequency range which includes the resonant frequency of crystal 10. The reader will recognize, therefore, that the means by which voltage is applied to the diode 44 are extremely important to the invention.

Conventionally available sweep generators generally are not ideally suited for use in testing crystals because the sweep rate is normally too fast to allow a high "Q" device like a crystal to display its true frequency response and, when the sweep width is narrowed, as it must be to obtain the details of the crystal frequency response, the stability of many commercially available sweep generators becomes unacceptably poor. Prior methods have, in general, used two separate oscillator systems to obtain all the necessary data concerning a crystal, a circumstance which is obviously undesirable.

The present invention contemplates that the disclosed circuit is compatible with and used with the sweep generator of an oscilloscope 48, which may also serve in part as the detector 26. Commercially available oscilloscopes, for example a Tektronix Model 535, include a sweep generator which is very stable for long duration (2-minute) cycles through a narrow sweep width (0.1 of center frequency).

When switch 50 is open the oscillator 30 is free running and is frequency adjusted, as previously described, by means of inductance 42 and capacitance 43. When switch 50 is closed, the sawtooth signal from generator 46 is amplified by the transistorized amplifier 52 and is applied in the form of a voltage drop across resistor 54 to the diode 44. In addition to controls in oscilloscope 48, the invention contemplates the use of a (sweep width control) potentiometer 56 and a resistive network including the (coarse center frequency control) resistor 58 and the (fine center frequency control) resistor 60. Variable resistor 62, which is connected between a positive power supply and the oscillator 30, is used to control the bias on transistor 32. Filters 64, 66, 67 and 68 are also included in the invention, as shown, to prevent high frequency leakage into the power supply. In addition filters 64 and 66 present high impedances and filters 67 and 68 present low impedances at their respective points of attachment to the high frequency circuitry (oscillator 30).

By now the operation of the invention is apparent. With the switch 50 open and the oscillator 30 free running or, if desired, with the switch 50 closed and the sawtooth generator 46 operating at a fairly high frequency, say 60 c.p.s., and a large frequency sweep, the inductance 42 and/or capacitance 43 is varied to coarsely tune the oscillator 30. Next the variable inductance 12 is tuned to optimize the response curve of crystal 10 and the attenuator 16 is set to obtain a suitably small crystal response at resonance. The fine tuning control of oscillator 30, i.e. by either inductance 42 or capacitor 43, is then manipulated to cause the oscillator frequency to closely approximate the resonant frequency of crystal 10. This may be done either with switch 50 closed and the frequency sweep width narrowed (control 56) to include only the resonant and other (fractional power point) frequencies of interest or with the switch 50 open. Thereafter, with switch 50 closed and at long time duration per sweep cycle (up to 2 minutes), the crystal is excited slowly through the narrow range of interest, the exact frequencies of interest being determined from meter 24 and the crystal impedance determined by the calibrated amplitude of detector 26. For extremely precise determination of the resonant frequency of crystal 10, the switch 50 may be opened and either resistor 60 or capacitor 43 manipulated to obtain a maximum indication in detector 26. These procedures may be repeated, if desired, at various energization levels, i.e., settings of attenuator 16.

There has been disclosed circuitry for testing crystals which includes a variable frequency oscillator having readily variable impedance components and which can be advantageously driven in a very stable manner through long duration cycles of very narrow frequency sweeps by the sawtooth sweep signal of an oscilloscope and which can further utilize the oscilloscope display provisions to rapidly determine the frequency and impedance characteristics of the crystal being tested. It should be understood, of course, that the foregoing disclosure relates to only a preferred embodiment of the invention and that modifications or alterations may be made therein without departing from the spirit and the scope of the invention as set forth in the appended claims.

What we claim and desire to be secured by Letters Patent of the United States is:

1. Apparatus for testing a crystal comprising:

voltage-controlled, variable frequency oscillator means connected to excite said crystal and having variable impedance components and a voltage-controlled variable-capacitive diode;

variable attenuation means connected between said oscillator means and functioning to selectively control the excitation level of said crystal;

an oscilloscope including display means and sawtooth generator means connected to said variable-capacitive diode;

variable inductance means connected in parallel with said crystal between said variable attenuation means and said oscilloscope; and instrumentation means connected to said crystal and including the display means of said oscilloscope and a frequency meter and functioning to display the frequency response and impedance characteristics of said crystal.

2. A circuit suitable for testing a crystal by using an oscilloscope which includes a sawtooth generator and display means, comprising:

a variable attenuator;

a first variable inductance connected in parallel with said crystal between said variable attenuator and said oscilloscope display means;

variable frequency oscillator means including first, second and third means for controlling the frequency of said oscillator, said first frequency control means including a second variable inductance, said second frequency control means including a variable capacitance and said third frequency control means including a variable voltage control diode which is connected through a switch to be controlled by said oscilloscope sawtooth generator; and circuit means connecting said oscillator means and said variable attenuator and including a frequency meter and a resistive network.